United States Patent
Wang (10) Patent No.: US 11,106,491 B2
(45) Date of Patent: Aug. 31, 2021

(54) METHOD AND SYSTEM FOR KERNEL ROUTINE CALLBACKS

(71) Applicant: Beijing DiDi Infinity Technology and Development Co., Ltd., Beijing (CN)

(72) Inventor: Yu Wang, San Jose, CA (US)

(73) Assignee: Beijing DIDi Infinity Technology and Development Co., Ltd., Beijing (CN)

(*) Notice: Subject to any disclaimer, the term of this patent is extended or adjusted under 35 U.S.C. 154(b) by 333 days.

(21) Appl. No.: 15/946,963

(22) Filed: Apr. 6, 2018

(65) Prior Publication Data

US 2019/0310883 A1 Oct. 10, 2019

(51) Int. Cl.
*G06F 9/48* (2006.01)
*G06F 9/54* (2006.01)

(52) U.S. Cl.
CPC ............ *G06F 9/4881* (2013.01); *G06F 9/545* (2013.01); *G06F 9/547* (2013.01)

(58) Field of Classification Search
CPC ......... G06F 9/4881; G06F 9/545; G06F 9/547
See application file for complete search history.

(56) References Cited

U.S. PATENT DOCUMENTS

| | | | | |
|---|---|---|---|---|
| 8,271,996 B1* | 9/2012 | Gould | ...................... | G06F 9/542 719/312 |
| 2004/0019804 A1 | 1/2004 | St. Pierre | | |
| 2005/0228923 A1 | 10/2005 | Zimmer et al. | | |
| 2006/0136460 A1* | 6/2006 | Pudipeddi | ............. | G06F 9/4411 |
| 2009/0204978 A1* | 8/2009 | Lee | ........................ | G06F 9/4812 719/321 |
| 2010/0218201 A1* | 8/2010 | Schneider | ............... | G06F 21/57 719/330 |
| 2012/0131375 A1 | 5/2012 | Adda et al. | | |
| 2012/0297485 A1* | 11/2012 | Maeda | .................... | G06F 21/56 726/23 |
| 2013/0304705 A1* | 11/2013 | Wong | ..................... | G06F 16/17 707/655 |

(Continued)

OTHER PUBLICATIONS

Unknown Authors, "Writing Postoperation Callback routines", docs.microsoft.com/en-us/windows-hardware/drivers/ifs/writing-postoperation-callback-routines, Apr. 20, 2017 (Year: 2017).*

(Continued)

*Primary Examiner* — Lewis A Bullock, Jr.
*Assistant Examiner* — Kevin X Lu
(74) *Attorney, Agent, or Firm* — Sheppard Mullin Richter & Hampton LLP (57) ABSTRACT

Systems and methods are provided for kernel routine callbacks. Such methods may include hooking a pre-callback handler and a post-callback handler to a pre-existing operating system of a computing device. According to the pre-callback handler, a kernel routine request for a kernel routine to be performed in a kernel mode of the operating system is obtained, whether to allow the kernel routine to be performed is determined, and the kernel routine is caused to be performed in the kernel mode to generate kernel routine results. According to the post-callback handler, whether to allow the kernel routine results of the kernel routine to be returned is determined, and the kernel routine results of the kernel routine is caused to be returned to an application that is executed in a non-kernel mode of the operating system.

20 Claims, 4 Drawing Sheets

(56) References Cited

U.S. PATENT DOCUMENTS

2014/0082327 A1* 3/2014 Ghose .................. G06F 11/00
712/205
2018/0181846 A1* 6/2018 Koziarz ................ G06F 3/1206

OTHER PUBLICATIONS

PCT International Search Report and the Written Opinion dated Feb. 27, 2019, issued in related International Application No. PCT/US18/63824 (9 pages).
"Technical Note TN2127, Kernal Authorization", https://developer.apple.com/library/archive/technotes/tn2127/_index.html, 2010, Apple Inc.
"Technical Q&A QA1574, Kernal's MAC framework", https://developer.apple.com/library/content/qa/qa1574/_index.html, 2008, Apple Inc.
"Mac_policy.h", https://github.com/apple/darwin-xnu/blob/xnu-4570.1.46/security/mac_policy.h#L84, 2017, GitHub.
"About App Sandbox", https://developer.apple.com/library/content/documentation/Security/Conceptual/AppSandboxDesignGuide/AboutAppSandbox/AboutAppSandbox.html, 2016, Apple Inc.
"Back up your Mac with Time Machine", https://support.apple.com/en-us/HT201250, 2019, Apple Inc.
"AppleMobileFileIntegrity", https://www.theiphonewiki.com/wiki/AppleMobileFileIntegrity, 2012, The Phone Wiki.
"File System Minifilter Drivers", https://docs.microsoft.com/en-us/windows-hardware/drivers/ifs/file-system-minifilter-drivers, 2017, Microsoft Inc.
"PsSetCreateProcessNotifyRoutine function", https://msdn.microsoft.com/en-us/library/windows/hardware/ff559951(v=vs.85).aspx, 2018, Microsoft Inc.
"ObRegisterCallbacks function", https://msdn.microsoft.com/en-us/library/windows/hardware/ff558692(v=vs.85).aspx, 2018, Microsoft Inc.
"Writing Preoperation and Postoperation Callback Routines", https://docs.microsoft.com/en-us/windows-hardware/drivers/ifs/writing-preoperation-and-postoperation-callback-routines, 2017, Microsoft Inc.
"Hooking", https://en.wikipedia.org/wiki/Hooking, 2019, Wikipedia.
"An Introduction to Kernel Patch Protection", https://blogs.msdn.microsoft.com/windowsvistasecurity/2006/08/12/an-introduction-to-kernel-patch-protection/, 2006, Microsoft Inc.

* cited by examiner

METHOD AND SYSTEM FOR KERNEL ROUTINE CALLBACKS

COPYRIGHT NOTICE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This disclosure generally relates to methods and systems for kernel routine callbacks.

BACKGROUND

Adding new monitoring features to a kernel of a pre-existing operating system of a computing system would be a useful way to enhance functionality of the computing system. For example, adding security features, such as a antivirus features, ransomware blocking features, data access auditing features, and data leakage monitoring features to a kernel of a pre-existing operating system would be beneficial in enhancing security level of the computing system. Depending on types of pre-existing operating systems, however, there are some restrictive measures that have been done by the manufacturer of the operating system against addition of such new features by third parties.

SUMMARY

Various embodiments of the present disclosure can include systems, methods, and non-transitory computer readable media for kernel routine callbacks. A method for kernel routine callbacks may comprise hooking a pre-callback handler and a post-callback handler to a pre-existing operating system of a computing device. According to the pre-callback handler, a kernel routine request for a kernel routine to be performed in a kernel mode of the operating system is obtained, whether to allow the kernel routine to be performed is determined, and the kernel routine is caused to be performed in the kernel mode to generate kernel routine results. According to the post-callback handler, whether to allow the kernel routine results of the kernel routine to be returned is determined, and the kernel routine results of the kernel routine is caused to be returned to an application that is executed in a non-kernel mode of the operating system.

In some embodiments, the method may further comprise upon determining that the kernel routine is not allowed to be performed, preventing the kernel routine from being performed and causing an pre-operation error to be returned to the application.

In some embodiments, the method may further comprise upon determining that the kernel routine results of the kernel routine are not allowed to be returned, causing a post-operation error to be returned to the application.

In some embodiments, the method may further comprise upon determining that the kernel routine results of the kernel routine are not allowed to be returned, modifying the kernel routine results of the kernel routine and causing the modified kernel routine results to be returned to the application. In some embodiments, said modifying the kernel routine results comprises filtering out at least part of data included in the kernel routine results.

In some embodiments, the pre-callback handler and post-callback handler are uniquely associated with the kernel routine, and a plurality of pre-callback handlers and a plurality of post-callback handlers associated with different types of kernel routines are hooked to the operating system.

In some embodiments, the kernel routine comprises to a file system operation. In some embodiments, the kernel routine comprises a non-file system operation and does not include a file system operation.

In some embodiments, the pre-callback handler and the post-callback handler are hooked to the operating system, in a state where the operating system is not protected by a kernel patch protection. In some embodiments, the operating system is a Mac OS or a 32-bit Windows OS.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Various embodiments of the present disclosure include systems, methods, and non-transitory computer readable media for kernel routine callbacks, which can be suitably applied to add new monitoring features to a kernel of a pre-existing operating system of a computing system, are described.

Depending on types of pre-existing operating systems, however, there are some restrictive measures that have been done by the manufacturer of the operating system against addition of such new features by third parties. For example, an operating system (e.g., macOS) available on the market provides two official system kernel exported interfaces of i) a Kernel Authorization interface and ii) a Mandatory Access Control interface, to add new features to the operating system. However, the kernel programming interface are limited to functions to several file operations and may lack flexibility to expand its availability to various functions. Also, the Mandatory Access Control interface can be denied access from third parties depending on the manufacturers program setting of the operating system. Indeed, a Mandatory Access Control interface of macOS is no longer available by third parties, because the manufacturer banned access to the Mandatory Access Control interface by third parties. In another example, an operating system (e.g., Windows 64-bits OS) available on the market restricts kernel patching by third parties by implementing a kernel patch protection, according to which, key resources used by a kernel or a kernel code are monitored and the operation system is shut down upon detecting an unauthorized patch of certain data structure or code.\

According to various embodiments of the present disclosure, a kernel patching is performed with respect to some operating systems that at least temporarily authorize a kernel patching thereon to add new monitoring features. According to the kernel patching, even if there is no system kernel exported interface available to non-manufacturing parties, it would be possible to add new monitoring features to a kernel of an operating system. To achieve this end, in some embodiments, the method for the kernel routine callbacks comprises hooking a pre-callback handler and a post-callback handler to a pre-existing operating system of a computing device. According to the pre-callback handler, a kernel routine call for a kernel routine to be performed in a kernel mode of the operating system is obtained, whether to allow the kernel routine to be performed is determined, and the kernel routine is caused to be performed in the kernel mode to generate kernel routine results. According to the post-callback handler, whether to allow the kernel routine results of the kernel routine to be returned is determined, and the kernel routine results of the kernel routine is caused to be returned to an application that is executed in a non-kernel mode of the operating system.

Figure 1:
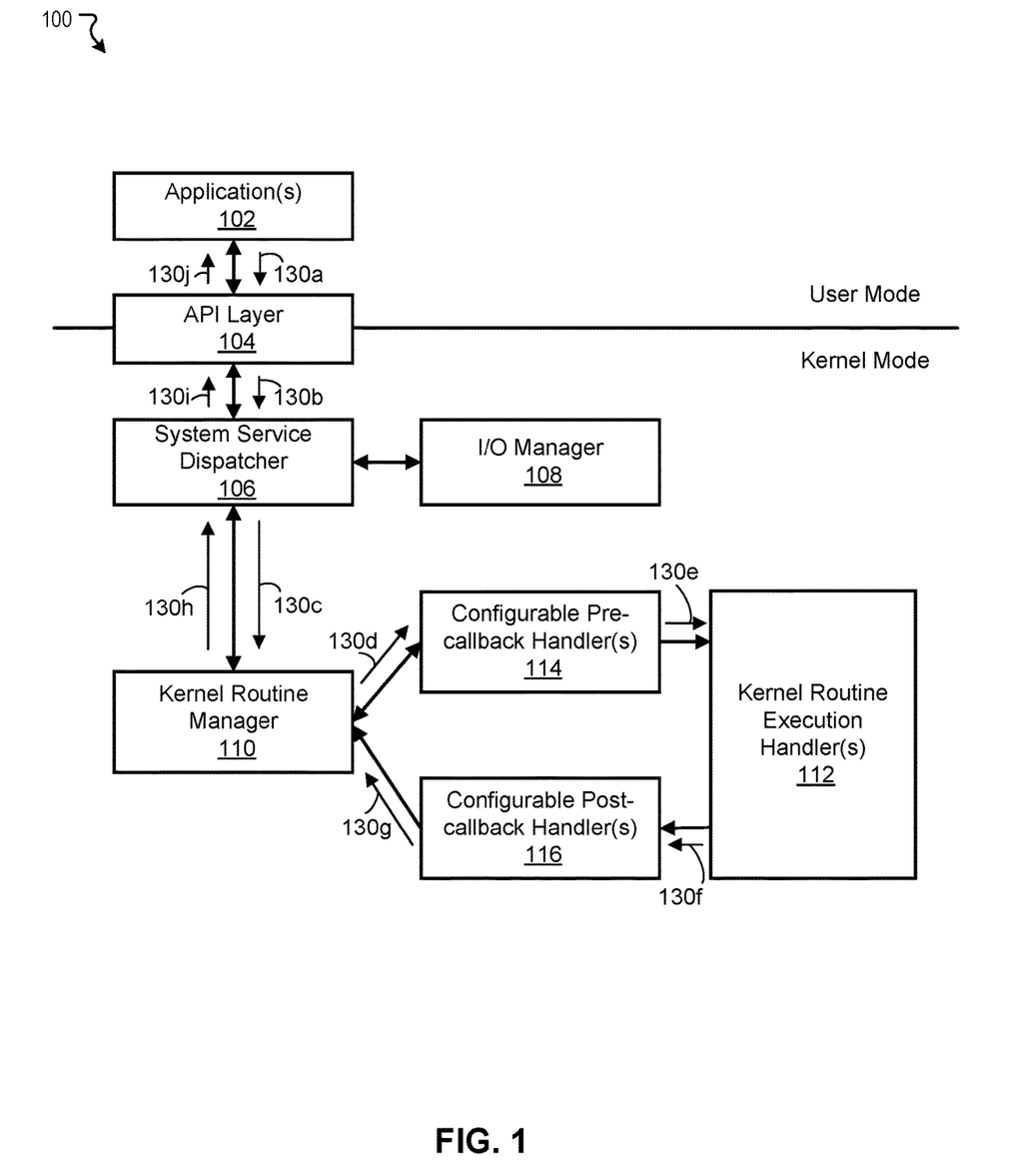
FIG. 1 illustrates an example of an operating system (OS) operation architecture for implementing kernel routine callbacks according to some embodiments.

FIG. 1 illustrates an example of an operating system (OS) operation architecture 100 for implementing kernel routine callbacks according to some embodiments. In the example of FIG. 1, the operation architecture 100 comprises application(s) 102 executed, an application programming interface (API) layer 104 specific to the application(s) 102, a system service dispatcher 106, an I/O manager 108, a kernel routine manager 110, a kernel routine execution handler 112, configurable pre-callback handler(s) 114, and configurable post-callback handler(s) 116. As shown, the application(s) 102 are executed in a user mode of an operating system and the system service dispatcher 106, the kernel routine manager 110, the kernel routine execution handler 112, the configurable pre-callback handler(s) 114, and the configurable post-callback handler(s) 116 are executed in a kernel mode of the operating system, although the present inventive subject matter is, of course, not limited to such an architecture. It shall be also appreciated that although some of the functional components of the operation architecture 100 are discussed in the singular sense, multiple instances of one or more of the various functional components may be employed.

In some embodiments, the operating system according to the present disclosure includes applicable operating systems regardless of computing devices to which the operating system is introduced. For example the computing devices may include a server, a personal computer such as a desktop computer and a laptop computer, a mobile phone (e.g., smartphone), a tablet, a smart device (e.g., smart watch), and a IoT (internet of things) device that runs on top of an operating system. Specifically, applicable operating system may include Mac-based operating systems (e.g., macOS, iOS), Windows-based operating systems, Android-based operating systems, Linux, and so on. Suitably, the present disclosure may be applicable to operating systems that do not employ kernel patch protection, e.g., macOS.

In some embodiments, the operating system according to the present disclosure may include an operating system for running on one or more virtual machines (VM) emulated in one or more physical computing systems centralized and/or distributed in a network. In some embodiments, when an the operating system according to the present disclosure is applied to an operating system (e.g., guest operating systems) of virtual machines running on top of a type-2 hypervisor, the operating system according to the present disclosure may also be applied to an operating system (e.g., host operating system) of a host machine. In some embodiments, when an the operating system according to the present disclosure is applied to one or more operating systems (e.g., guest operating systems) of virtual machines running on top of a type-1 or type 2 hypervisor, the operating system according to the present disclosure may be applied to part of the guest operating systems, and not all of the guest operating systems. For example, one or more guest operating systems adopting macOS may employ the operating system according to the present disclosure and one or more guest operating systems adopting Windows-based OS may not employ the operating system according to the present disclosure.

In some embodiments, the application(s) 102 shown in FIG. 1 are intended to represent one or more applications executed on top of an operating system. As shown in FIG. 1, the application(s) 102 are executed in a user mode of the operating system. In some embodiments, in a user mode of an operating system, an executing code typically does not have ability to directly access hardware or reference memory of a computing system running the operating system. In some embodiments, a code of an application 102 running in a user mode must delegate to the API layer 104 to access the hardware or memory. Due to the protection afforded by this sort of isolation, crashes in a user mode are usually recoverable.

In some embodiments, the API layer 104 shown in FIG. 1 is intended to represent one or more APIs associated with corresponding functions to be called by an application 102 and/or one or more APIs associated with different applications 102. In some embodiments, function calls made by the application(s) 102 are passed to components executed in the kernel mode through the API layer 104. For example, when an I/O request that requests input and/or output with respect to hardware and/or memory of a computing system running the operating system is generated by an application 102 running in a user mode, the I/O request is passed through an API corresponding to I/O request from the application 102 in the API layer 104.

In some embodiments, the system service dispatcher 106 shown in FIG. 1 is intended to represent a functional module configured to cause function calls received through the API layer 104 to be queued in a system service dispatching table of the system service dispatcher 106 and select a function call for which a kernel routine (process) is to be carried out from the queued function calls. In some embodiments, the system service dispatcher 106 passes the selected function call to the kernel routine manager 110 such that a kernel process corresponding to the selected function call is performed in a kernel mode of the operating system. In some embodiments, the system service dispatcher 106 passes a function call result to the API layer 104 such that the function call result is forwarded to an application 102 that has generated a corresponding function call. In some embodiments, in a kernel mode of an operating system, an executing code has complete and unrestricted access to the underlying hardware of a computing system running the operating system. The operating system can typically execute any CPU instruction and reference any memory address. In some embodiments, the kernel mode is generally reserved for the lowest-level, most trusted functions of the operating system.

In some embodiments, the system service dispatching table of the system service dispatcher 106 is a logical table in which function calls received through the API layer 104 are queued. In some embodiments, a status of each queued function call is maintained in the system service dispatching table, such that the status of the function call such as ready to be processed, under process, processed, can be managed. In some embodiments, in the system service dispatching table, the received function calls are queued in an applicable order such as first-in-first-out (FIFO) and interruptible depending on priority levels of the function calls. In some embodiments, the system service dispatcher 106 refers to the queued order and/or the status of the function calls to select the next function call to be passed to the kernel routine manager 110, and cause the status of the function calls to be updated based on processing state.

In some embodiments, the I/O manager 108 in FIG. 1 is intended to represent a functional module configured to manage communication between application(s) 102 and interfaces provided by device drivers. In some embodiments, the I/O manager 108 queues asynchronous requests from the application(s) 102 and maintains the status of the requests.

In some embodiments, the kernel routine manager 110 shown in FIG. 1 is intended to represent a functional module configured to generate a kernel routine request based on a function call received from the system service dispatcher 106, and cause a kernel routine (process) corresponding to the kernel routine request to be executed. In some embodiments, the kernel routine manager 110 is also configured to receive a kernel routine result generated through execution of a kernel routine and further process the kernel routine result according to the kernel routine request. For example, the kernel routine manager 110 returns the kernel routine result to the system service dispatcher 106. In another example, the kernel routine manager 110 generates a secondary kernel routine request to be further executed based on the kernel routine result generated through execution of a kernel routine.

In some embodiments, the kernel routine execution handler 112 shown in FIG. 1 is intended to represent a functional module configured to execute a kernel routine corresponding to a kernel routine request generated by the kernel routine manager 110. For example, a kernel routine request designates an I/O operation with respect to hard disk and/or memory, the kernel routine execution handler 112 executes the I/O operation. In some embodiments, depending on different kernel routines requested by kernel routine requests, the kernel routine execution handler 112 execute the different kernel routines. For example, when a first kernel routine request designates a first kernel routine, the kernel routine execution handler 112 executes the first kernel routine; and when a second kernel routine request designates a second kernel routine different from the first kernel routine, the kernel routine execution handler 112 executes the second kernel routine. After the kernel routine execution handler 112 executes a kernel routine, the kernel routine execution handler 112 generates a kernel routine result and sends the generated kernel routine results towards the kernel routine manager 110.

In some embodiments, the configurable pre-callback handler(s) 114 shown in FIG. 1 is intended to represent a functional module configured to perform a pre-operation callback routine associated with a kernel routine requested by a kernel routine received from the kernel routine manager 110. In a specific implementation, the pre-operation callback routine includes a checking process of input parameters included in a kernel routine request, such as a name, a signature, file hash, and so on for a process to be executed, and a name, a signature, file hash, and so on for a driver to execute the process. For example, when one or more of the checked input parameters includes or generates an error, the configurable pre-callback handler(s) 114 returns the kernel routine request to the kernel routine manager 110, such that a kernel routine corresponding to the kernel routine request is not executed. In another example, when the checked input parameters includes or generates no error, the configurable pre-callback handler(s) 114 passes a kernel routine request from the kernel routine manager 110 to the kernel routine execution handler 112, such that a kernel routine corresponding to the kernel routine request is executed thereby. In some embodiments, when the configurable pre-callback handler(s) 114 returns (i.e., rejects) a kernel routine request, the kernel routine manager 110 generates an error notification such that the error notification is forwarded to an application 102 that generated a function call corresponding to the rejected kernel routine request through the system service dispatcher 106 and the API layer 104.

In some embodiments, depending on a type of kernel routine requests, the configurable pre-callback handler(s) 114 may or may not perform the pre-operation callback routine, and the pre-operation callback routine performed by the configurable pre-callback handler(s) 114 may be different. For example, when the kernel routine manager 110 generates a first kernel routine request to perform a first kernel routine, the configurable pre-callback handler(s) 114 performs a pre-operation callback routine associated with the first kernel routine; and when the kernel routine manager 110 generates a second kernel routine request to perform a second kernel routine different from the first kernel routine, the configurable pre-callback handler(s) 114 does not perform any pre-operation callback routine and simply pass the second kernel routine request to the kernel routine execution handler 112. In another example, when the kernel routine manager 110 generates a first kernel routine request to perform a first kernel routine, the configurable pre-callback handler(s) 114 performs a first pre-operation callback routine associated with the first kernel routine; and when the kernel routine manager 110 generates a second kernel routine request to perform a second kernel routine different from the first kernel routine, the configurable pre-callback handler(s) 114 performs a second pre-operation callback routine different from the first pre-operation callback routine.

In some embodiments, the configurable post-callback handler(s) 116 shown in FIG. 1 is intended to represent a functional module configured to perform a post-operation callback routine associated with a kernel routine performed by the kernel routine manager 110. In a specific implementation, the post-operation callback routine includes a checking process of output parameters included in a kernel routine result, a modification process of modifying the output parameters to indicate an error of the kernel routine result, and/or a filtering process of filtering an non-accessible portion from the kernel routine result. For example, through the modified output parameter, the kernel routine result may indicate that an application 102 that generated a function call corresponding to the kernel routine does not have access to contents of the kernel routine result. In another example, through the modified output parameter, the kernel routine result may cause a sequence of kernel routines to perform some functions (e.g., modification of a process code) to be aborted. In some embodiments, when the post-operation callback routine finds no errors through the checking process, the configurable post-callback handler(s) 116 returns a kernel routine result obtained by the kernel routine execution handler 112 to the kernel routine manager 110, such that a subsequent process is carried out.

In an example of operation of the operation architecture 100 shown in FIG. 1, the application(s) 102 running in a user mode of an operating system generates a function call and passes to the API layer 104 (130a). In the example of operation, the API layer 104 passes the function call generated by the application(s) 102 to the system service dispatcher 106 running in a kernel mode of the operating system (130b). In the example of operation, the system service dispatcher 106 queues the received function call in the system service dispatching table, and forwards the queued function call to the kernel routine manager 110 when the queued function call becomes ready to be processed (130c).

In the example of operation, the kernel routine manager 110 generates a kernel routine request corresponding to the received function call and forwards the generated kernel routine request to the configurable pre-callback handler(s) 114 (130d). In the example of operation, the configurable pre-callback handler(s) 114 performs a pre-operation callback routine associated with the received kernel routine request by referring to input parameters of the kernel routine request. In the example of operation, when the configurable pre-callback handler(s) 114 finds an error in the kernel routine request, the configurable pre-callback handler(s) 114 rejects the kernel routine request, such that a kernel routine requested by the kernel routine request is not executed. In the example of operation, when the configurable pre-callback handler(s) 114 finds no error in the kernel routine request, the configurable pre-callback handler(s) 114 forwards the kernel routine request to the kernel routine execution handler 112 such that the kernel routine requested by the kernel routine request is executed thereby (130e).

In the example of operation, the kernel routine execution handler 112 generates a kernel routine result obtained through execution of the requested kernel routine, and passes the generated kernel routine result to the configurable post-callback handler(s) 116 (130f). In the example of operation, the configurable post-callback handler(s) 116 performs a post-operation callback routine associated with the received kernel routine result by referring to output parameters of the kernel routine result and passes a kernel routine result subjected to the post-operation callback routine to the kernel routine manager 110 (130g). In the example of operation, when the configurable post-callback handler(s) 116 finds an error in the kernel routine result, the configurable post-callback handler(s) 116 modifies and/or filters the kernel routine result, such that an intended function by the application is aborted. In the example of operation, when the configurable post-callback handler(s) 116 finds no error in the kernel routine result, the configurable post-callback handler(s) 116 forwards the kernel routine result to the kernel routine manager 110 such that a subsequent operation, such as returning the kernel routine result (the function call result) back to the application 102 and/or further performing kernel routine(s) to be performed by the kernel routine execution handler 112, is performed.

In the example of operation, the kernel routine manager 110 returns the received kernel routine result to the system service dispatcher 106 (130h). In the example of operation, the system service dispatcher 106 updates the system service dispatching table 108 based on the received kernel routine result and passes a function call result corresponding to the kernel routine result to the API layer 104 (130i). In the example of operation, the API layer 104 passes the function call result to the application(s) 102 (130j).

As is understood by skilled artisans in the relevant computer and Internet-related arts, each functional component (e.g., engine, module, or database) illustrated in FIG. 1 may be implemented using hardware (e.g., a processor of a machine) or a combination of logic (e.g., executable software instructions) and hardware (e.g., memory and processor of a machine) for executing the logic. Furthermore, the various functional components depicted in FIG. 1 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple engines. Specific hardware structure of the functional components illustrated in FIG. 1 is exemplified with reference to FIG. 4.

Figure 2:
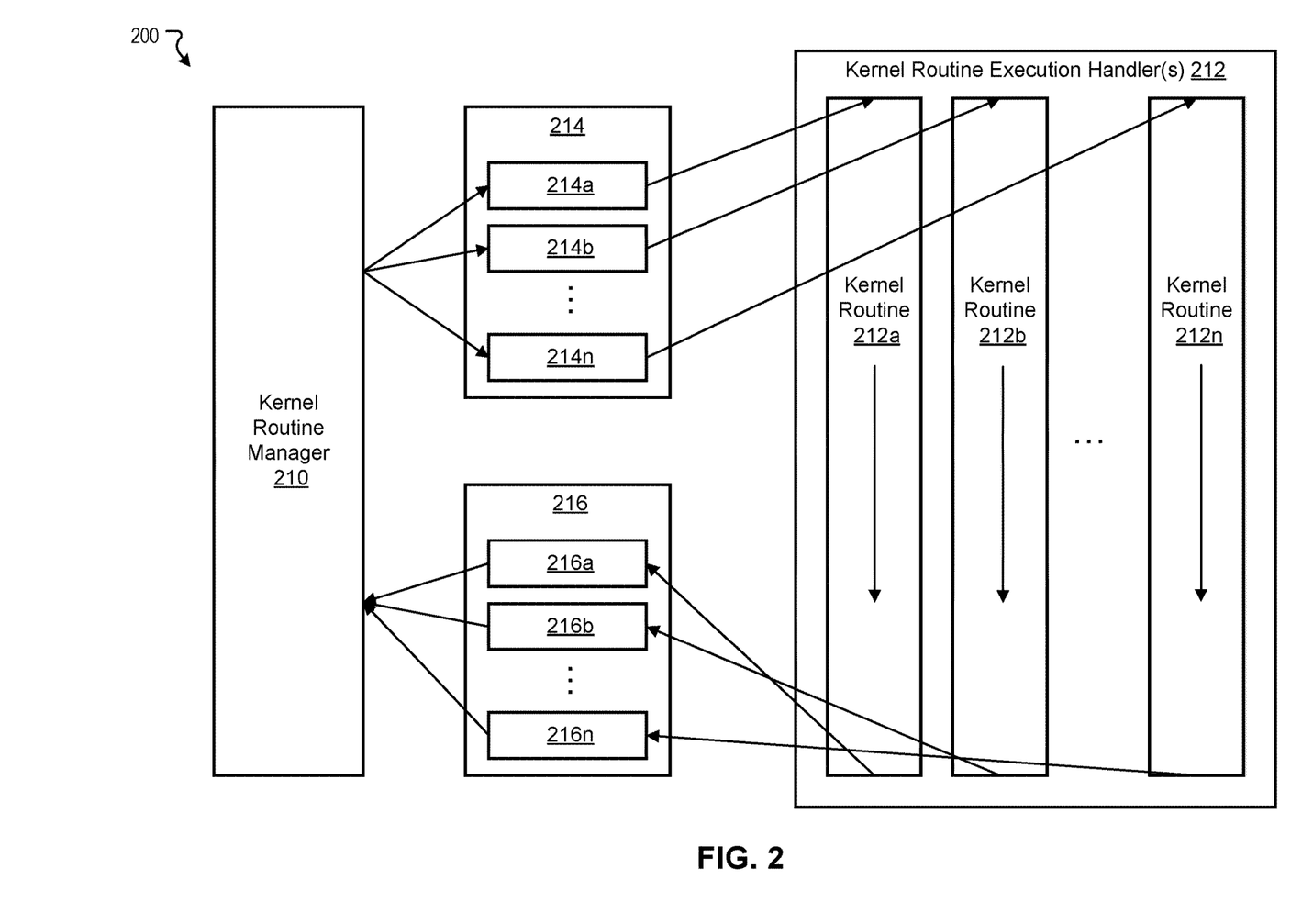
FIG. 2 illustrates an example of a detailed operating system (OS) operation architecture related to pre-operation callback routine and post-operation callback routine according to some embodiments.

FIG. 2 illustrates an example of a detailed operating system (OS) operation architecture 200 related to pre-operation callback routine and post-operation callback routine according to some embodiments. In the example of FIG. 2, the detailed OS operation architecture 200 comprises a kernel routine manager 210, a kernel routine execution handler 212, configurable pre-callback handler(s) 214, and configurable post-callback handler(s) 216. In some embodiments, the kernel routine manager 210, the kernel routine execution handler 212, the configurable pre-callback handler(s) 214, and the configurable post-callback handler(s) 216 correspond to the kernel routine manager 110, the kernel routine execution handler 112, the configurable pre-callback handler(s) 114, and the configurable post-callback handler(s) 116 in FIG. 1, respectively.

In some embodiments, the kernel routine execution handler 212 shown in FIG. 2 is configured to execute one of a plurality of kernel routines 212a-212n ($n \geq 1$) designated by a kernel routine request. In some embodiments, the kernel routines 212a-212n are not limited to file system-related routines and may include non-file system-related routines. For example, when a kernel routine 212a is executed in response to a kernel routine request, input parameters for the kernel routine 212a are input, the kernel routine 212a are executed based on the input parameters, and output parameters are generated as a result of the kernel routine 212a. The same or similar process is carried out with respect to each of the kernel routines 212a-212n, when a corresponding kernel routine request is received.

In some embodiments, the configurable pre-callback handler(s) 214 shown in FIG. 2 is configured to register one or more pre-callback sub-handlers 214a-214n ($n \geq 1$) each associated with one of the kernel execution routines 212a-212n. For example, the pre-callback sub-handlers 214a, 214b, . . . , 214n are associated with the kernel routines 212a, 212b, . . . , 212n, respectively. In a specific implementation, when a kernel routine request generated by the kernel routine manager 210 requests execution of the kernel routine 212a, the pre-callback sub-handler 214a registered therefore is pulled up and the pre-callback sub-handler 214a performs a pre-operation callback routine corresponding to the kernel routine 212a. Similarly, the pre-callback sub-handlers 214b, . . . , 214n are pulled up for the kernel routines 212b, . . . , 212n, and the pre-callback sub-handlers 214b, . . . , 214n perform corresponding pre-operation callback routines.

In some embodiments, when a kernel patch protection is not in effect, the configurable pre-callback handler(s) 214 is capable of being introduced in (e.g., hooked to) the operating system. For example, in a Mac-based operating system (e.g., macOS) and a 32-bit Windows-based operating system, a kernel patch protection is not employed, and therefore the configurable pre-callback handler(s) 214 can be hooked to the operating system. In another example, in a 64-bit Windows-based operating system, a kernel patch protection is active in default, and therefore, the kernel patch protection may need to be disabled to hook the configurable pre-callback handler(s) 214. Further, when the configurable pre-callback handler(s) 214 is hooked to the operating system, the pre-callback sub-handlers 214a-214n can be freely added or removed depending on specific requirements (e.g., security level, processing speed, etc.) for the kernel of the operating system. For example, when a security feature associated with a certain kernel routine is needed, a pre-callback sub-handler configured to perform a pre-operation callback routine suitable for the security feature may be added to the configurable pre-callback handler(s) 214. In another example, when a security feature associated with a certain kernel routine is no longer needed, a pre-callback sub-handler configured to perform a pre-operation callback routine suitable for the security feature may be deleted from the configurable pre-callback handler(s) 214. In the alternative embodiments, a plurality of individual pre-callback handlers may be added or removed for corresponding kernel routines.

In some embodiments, the configurable post-callback handler(s) 216 shown in FIG. 2 is configured to register one or more post-callback sub-handlers 216a-216n (n≥1) each associated with one of the kernel execution routines 212a-212n. For example, the post-callback sub-handlers 216a, 216b, . . . , 216n are associated with the kernel routines 212a, 212b, . . . , 212n, respectively. In a specific implementation, when a kernel routine result generated by the kernel routine execution handler 212 as a result of execution of the kernel routine 212a, the post-callback sub-handler 216a registered therefore is pulled up and the post-callback sub-handler 216a performs a post-operation callback routine corresponding to the kernel routine 212a. Similarly, the post-callback sub-handlers 216b, . . . , 216n are pulled up for the kernel routines 212b, . . . , 212n, and the post-callback sub-handlers 214b, . . . , 214n perform corresponding post-operation callback routines.

In some embodiments, similarly to the configurable pre-callback handler(s) 214, when a kernel patch protection is not in effect, the configurable post-callback handler(s) 216 is capable of being introduced in (e.g., hooked to) the operating system. Also, the post-callback sub-handlers 216a-216n can be freely added or removed depending on specific requirements for the kernel of the operating system.

Depending on a specific implementation of the embodiments, a kernel routine may or may not have an associated pre-callback sub-handler and/or an associated post-callback sub-handler. For example, a first kernel routine may have both an associated pre-callback sub-handler and an associated post-callback sub-handler. In another example, a second kernel routine may have an associated pre-callback sub-handler and may not have an associated post-callback sub-handler. In still another example, a third kernel routine may not have an associated pre-callback sub-handler and may have an associated post-callback sub-handler. In still another example, a fourth kernel routine may not have both an associated pre-callback sub-handler and an associated post-callback sub-handler.

Advantageously, according to the pre-operation callback routine and/or the post-operation callback routine, functional layers for monitoring a kernel routine can be added to a kernel of an operating system. In some embodiments, the functional layers for monitoring a kernel routine can function as a security layer for auditing kernel routines and/or blocking malicious kernel patching. For example, according to a pre-operation callback routine implemented against unauthorized kernel patching, a kernel routine request to load a driver (e.g., malicious driver) to an operating system is detected through the pre-operation callback routine, and a driver loading routine is aborted. In another example, according to a post-operation callback routine implemented against unauthorized kernel patching, a kernel routine result indicating a failure to load the driver is obtained, and returned to an application requesting the loading of the driver.

Malicious attackers may attempt to trigger and exploit system kernel vulnerabilities using various methods. Those methods may include input of a malformed array index to trigger an array out-of-bounds access vulnerability, input of a set of malformed parameter combinations to trigger an integer overflow vulnerability, and sending of a malicious destroy window request to trigger a kernel Use-After-Free vulnerability. According to the pre-operation callback routine and/or the post-operation callback routine, it is possible to prevent system kernel vulnerabilities from being triggered by these methods. In particular, the pre-operation callback routine and/or the post-operation callback routine may be useful as a temporary vulnerability mitigation solution before an official patch from operating system vendors becomes available, which may takes months before the vulnerability become known. Also, the pre-operation callback routine and/or the post-operation callback routine may be useful for operating systems that no longer officially supported, i.e., official security patch is no longer released, such as Windows XP.

Figure 3:
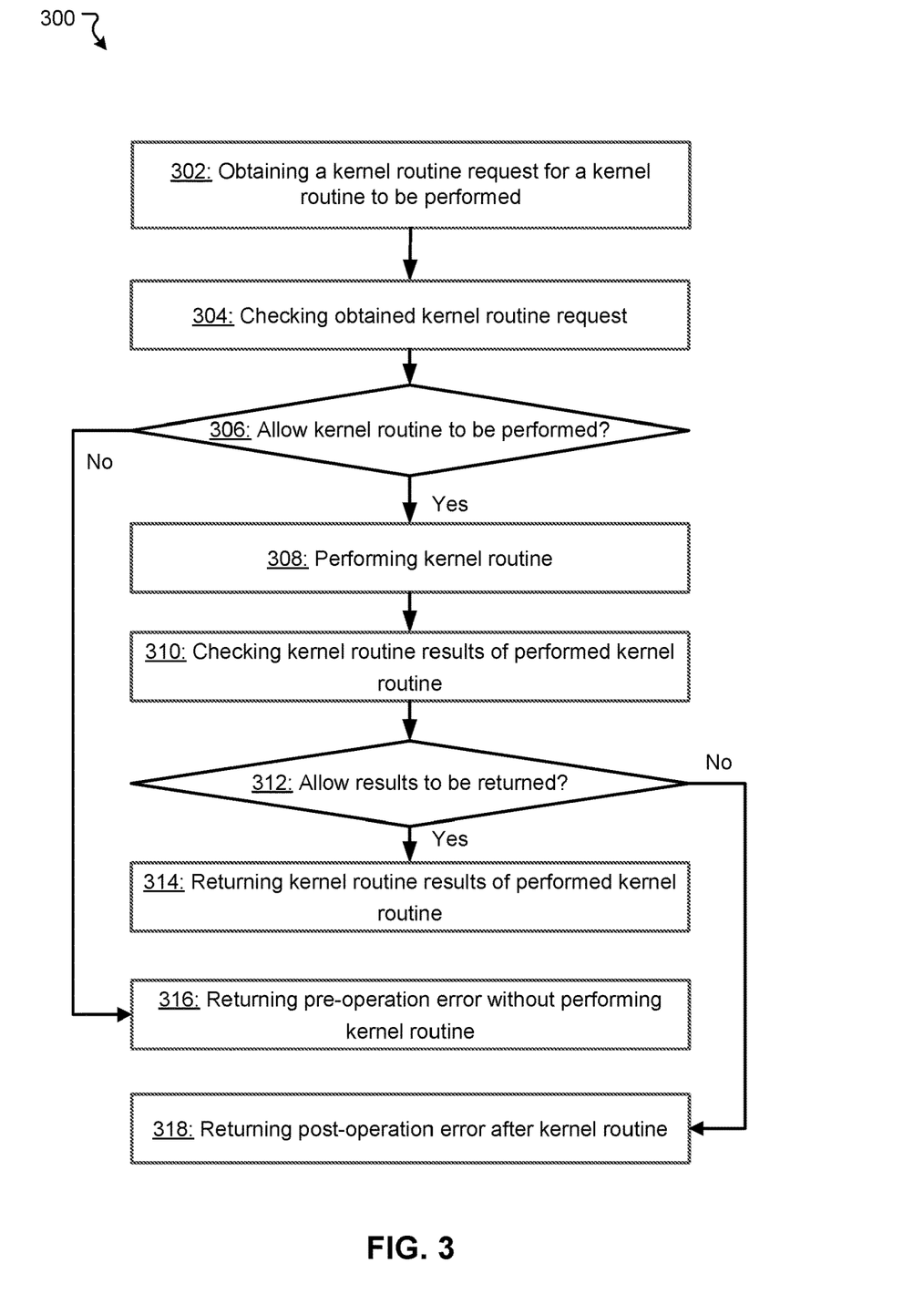
FIG. 3 illustrates a flowchart of an example method for carrying out pre-operation callback routine and post-operation callback routine according to some embodiments.

FIG. 3 illustrates a flowchart of an example method 300 for carrying out pre-operation callback routine and post-operation callback routine according to some embodiments. This flowchart described in this paper illustrate modules (and potentially decision points) organized in a fashion that is conducive to understanding. It should be recognized, however, that the modules can be reorganized for parallel execution, reordered, modified (changed, removed, or augmented), where circumstances permit. The method 300 may be implemented in various environments including, for example, the OS operation architecture 100 of FIG. 1. The example method 300 may be implemented by one or more components of the OS operation architecture 100 in FIG. 1 and/or the computer system 400 of FIG. 4. The example method 300 may be implemented by multiple systems similar to the OS operation architecture 100. The operations of method 300 presented below are intended to be illustrative.

In module 302 of FIG. 3, a kernel routine request for a kernel routine to be performed is obtained. Applicable module for obtaining a kernel routine request, such as the configurable pre-callback handler(s) 114 in FIG. 1 and/or the configurable pre-callback handler(s) 214 in FIG. 2, obtains the kernel routine request. In some embodiments, the kernel routine request is obtained from applicable module such as the kernel routine manager 110 in FIG. 1 and/or the kernel routine manager 210 in FIG. 2. In some embodiments, the kernel routine request designates a specific kernel routine to be performed, which is, for example, a file system-operation and/or a non-file system-related operation. In some embodiments, in order to perform module 302, the configurable pre-callback handler(s) 114 in FIG. 1 and/or the configurable pre-callback handler(s) 214 are hooked to an operating system in advance as a preliminary step through an inline hook method.

In module 304 of FIG. 3, the obtained kernel routine request is checked to determine whether or not the obtained kernel routine request includes an erroneous (unacceptable) request. Applicable module for checking a kernel routine request, such as the configurable pre-callback handler(s) 114 in FIG. 1 and/or the configurable pre-callback handler(s) 214 in FIG. 2, checks the obtained kernel routine request. In some embodiments, input parameters of the obtained kernel routine request, such as process name, signature, and file hash of a process and/or a driver, are checked with respect to certain criteria (e.g., threshold and/or standard value (range)).

In decision point 306 of FIG. 3, whether or not the kernel routine is allowed to be performed is determined. In some embodiments, applicable module for determining whether or not a kernel routine is allowed to be performed, such as the configurable pre-callback handler(s) 114 in FIG. 1 and/or the configurable pre-callback handler(s) 214 in FIG. 2, determines whether or not the kernel routine is allowed to be performed. In some embodiments, a rule to make a decision in decision point 306 is based on a local rule determined locally at a corresponding device running the operating system and/or an external rule instructed from a cloud side over the Internet. In some embodiments, when a value of an input parameter exceeds a threshold and/or does not match a standard value (range), it is determined that the kernel routine is not allowed to be performed. On the other hand, when a value of an input parameter does not exceeds a threshold and/or matches a standard value range, it is determined that the kernel routine is allowed to be performed. When it is determined that the kernel routine is not allowed to be performed, the method 300 proceeds to module 316. When it is determined that the kernel routine is allowed to be performed, the method 300 proceeds to module 308.

In module 308 of FIG. 3, a kernel routine that is determined as allowed to be performed in module 306 is performed. Applicable module for performing a kernel routine, such as the kernel routine execution handler(s) 112 in FIG. 1 and/or the kernel routine execution handler(s) 212 in FIG. 2, performs the kernel routine. In some embodiments, the kernel routine includes a sequence of code processing operations performed based on input parameters included in a kernel routine request. In some embodiments, as a result of a sequence of code processing operations of a kernel routine, one or more output parameters are obtained as kernel routine results.

In module 310 of FIG. 3, the obtained kernel routine results of the performed kernel routine is checked to determine whether or not the obtained kernel routine results include an erroneous (unacceptable) processing result. Applicable module for checking a kernel routine result, such as the configurable post-callback handler(s) 116 in FIG. 1 and/or the configurable post-callback handler(s) 216 in FIG. 2, checks the obtained kernel routine results. In some embodiments, output parameters of the obtained kernel routine result, such as file contents, object handle(s), process token(s), kernel memory data, configuration data, and/or system passwords, are checked with respect to certain criteria (e.g., threshold and/or standard value (range)) in a similar manner as the checking of the input parameters performed in module 304.

In module 312 of FIG. 3, whether or not kernel routine results are allowed to be returned is determined. Applicable module for determining whether or not kernel routine results are allowed to be returned, such as the configurable post-callback handler(s) 116 in FIG. 1 and/or the configurable post-callback handler(s) 216 in FIG. 2, determines whether or not the kernel routine results are allowed to be returned. In some embodiments, when a value of an output parameter exceeds a threshold and/or does not match a standard value (range), it is determined that the kernel routine results are not allowed to be returned. On the other hand, when a value of an output parameter does not exceeds a threshold and/or matches a standard value range, it is determined that the kernel routine results are allowed to be returned. When it is determined that the kernel routine results are not allowed to be returned, the method 300 proceeds to module 318. When it is determined that the kernel routine results are allowed to be returned, the method 300 proceeds to module 314.

In module 314 of FIG. 3, kernel routine results of the performed kernel routine are returned. Applicable module for returning the kernel routine results, such as the configurable post-callback handler(s) 116 in FIG. 1 and/or the configurable post-callback handler(s) 216 in FIG. 2, returns the kernel routine results of the performed kernel routine. In some embodiments, when the kernel routine includes a write operation according to a file system, the kernel routine results may include an acknowledgement of successful completion of the write operation. In some embodiments, when the kernel routine includes a read operation according to a file system, the kernel routine results may include datasets read through the read operation. In some embodiments, the kernel routine results are initially returned to an applicable module such as the kernel routine manager 110 in FIG. 1 and/or the kernel routine manager 210 in FIG. 2, subsequent processing such as returning to an application and/or execution of further kernel routine(s) is carried out.

In module 316 of FIG. 3, a pre-operation error is returned without performing requested kernel routine. Applicable module for returning a pre-operation error, such as the configurable pre-callback handler(s) 114 in FIG. 1 and/or the configurable pre-callback handler(s) 214 in FIG. 2, returns the pre-operation error. In some embodiments, the pre-operation error indicates that the requested kernel routine is rejected and/or the requested kernel routine has not been performed.

In module 318 of FIG. 3, a post-operation error is returned without performing requested kernel routine. Applicable module for returning a post-operation error, such as the configurable post-callback handler(s) 116 in FIG. 1 and/or the configurable post-callback handler(s) 216 in FIG. 2, returns the post-operation error. In some embodiments, the post-operation error indicates that the requested kernel result cannot be accessed and/or the requested kernel routine has not been successfully performed.

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 4:
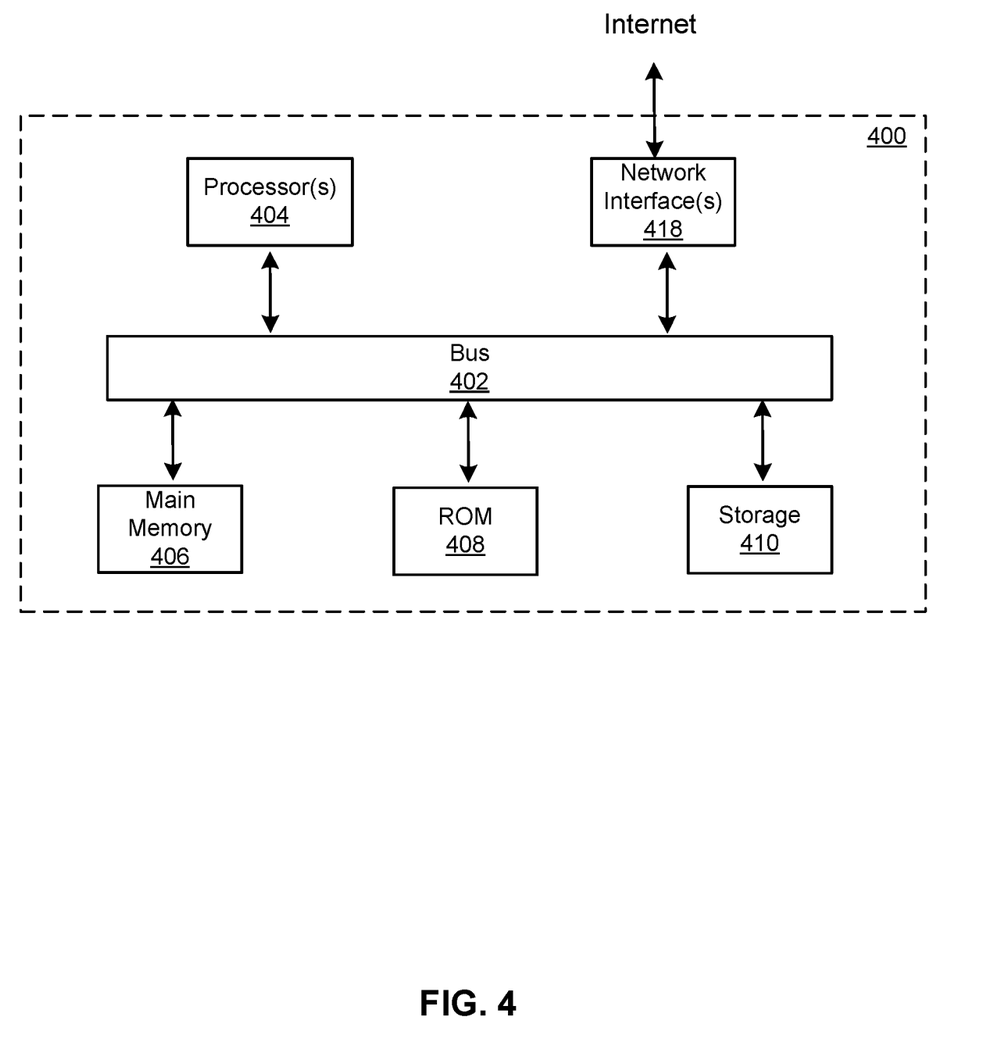
FIG. 4 illustrates a block diagram of an example computer system in which any of the embodiments described herein may be implemented.

FIG. 4 is a block diagram that illustrates a computer system 400 upon which any of the embodiments described herein may be implemented. Specifically, the system 400 enables the functional components of the system 100 described in FIG. 1 to function as described above. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 4504. Such instructions, when stored in storage media accessible to processor 404, render computer system 400 into a special-purpose machine that is customized to perform the operations specified in the instructions. The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The main memory 406, the ROM 408, and/or the storage 410 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

The computer system 400 can send messages and receive data, including program code, through the network(s), network link and communication interface 518. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method comprising:
   hooking a pre-callback handler and a post-callback handler to an operating system of a computing device;
   obtaining, by the pre-callback handler, a kernel routine request for a kernel routine to be performed in a kernel mode of the operating system;
   determining, by the pre-callback handler, whether to allow the kernel routine to be performed based on one or more input parameters of the kernel routine request, wherein the determination by the pre-callback handler is based on whether a value of at least one of the input parameters exceeds a threshold and/or matches a standard input value;

upon determining that the kernel routine is allowed to be performed, causing the kernel routine to be performed in the kernel mode to generate kernel routine results;
determining, by the post-callback handler, whether to allow the kernel routine results of the kernel routine to be returned based on one or more output parameters of the kernel routine request, wherein the determination by the post-callback handler is based on whether a value of at least one of the output parameters exceeds a threshold and/or matches a standard output value;
upon determining that the kernel routine results of the kernel routine are allowed to be returned, causing the kernel routine results of the kernel routine to be returned to an application that is executed in a non-kernel mode of the operating system; and
upon determining that the kernel routine results are not allowed to be returned,
modifying the kernel routine results, wherein the modifying the kernel routine results comprises filtering out a portion from the kernel routine results that is not accessible by a function call corresponding to the kernel routine, and
causing the modified kernel routine results and a first post-operation error indicating the portion of the kernel routine results has not been accessed to be returned to the application.

2. The method of claim 1, further comprising upon determining that the kernel routine is not allowed to be performed, preventing the kernel routine from being performed and causing a pre-operation error to be returned to the application.

3. The method of claim 1, further comprising upon determining that the kernel routine results of the kernel routine are not allowed to be returned, causing a post-operation error to be returned to the application.

4. The method of claim 1, wherein the filtering out the portion from the kernel routine results further comprises filtering out at least one of the one or more output parameters included in the kernel routine results.

5. The method of claim 1, wherein the pre-callback handler and the post-callback handler are uniquely associated with the kernel routine, and a plurality of pre-callback handlers and a plurality of post-callback handlers associated with different types of kernel routines are hooked to the operating system.

6. The method of claim 1, wherein the kernel routine comprises a file system operation.

7. The method of claim 1, wherein the kernel routine comprises a non-file system operation and does not include a file system operation.

8. The method of claim 1, wherein the pre-callback handler and the post-callback handler are hooked to the operating system, in a state where the operating system is not protected by a kernel patch protection.

9. The method of claim 1, wherein the operating system is a macOS.

10. A computing system comprising:
one or more processors; and
a memory storing instructions that, when executed by the one or more processors, cause the computing system to:
obtain, by a pre-callback handler hooked to an operating system of the computing system, a kernel routine request for a kernel routine to be performed in a kernel mode of an operating system of the computing system;
determine, by the pre-callback handler, whether to allow the kernel routine to be performed based on one or more input parameters of the kernel routine request, wherein the determination is based on whether a value of at least one of the input parameters exceeds a threshold and/or matches a standard input value;
upon determining that the kernel routine is allowed to be performed, cause the kernel routine to be performed in the kernel mode to generate kernel routine results;
determine, by a post-callback handler that is also hooked to the operating system of the computing system, whether to allow the kernel routine results of the kernel routine to be returned based on one or more output parameters of the kernel routine request, wherein the determination is based on whether a value of at least one of the output parameters exceeds a threshold and/or matches a standard output value;
upon determining that the kernel routine results of the kernel routine are allowed to be returned, cause the kernel routine results of the kernel routine to be returned to an application that is executed in a non-kernel mode of the operating system; and
upon determining that the kernel routine results are not allowed to be returned,
modify the kernel routine results, wherein the modifying the kernel routine results comprises filtering out a portion from the kernel routine results that is not accessible by a function call corresponding to the kernel routine, and
cause the modified kernel routine results and a first post-operation error indicating the portion of the kernel routine results has not been accessed to be returned to the application.

11. The computing system of claim 10, wherein the instructions further cause the computing system to, upon determining that the kernel routine is not allowed to be performed, prevent the kernel routine from being performed and cause a pre-operation error to be returned to the application.

12. The computing system of claim 10, wherein the instructions further cause the computing system to, upon determining that the kernel routine results of the kernel routine are not allowed to be returned, cause a post-operation error to be returned to the application.

13. The computing system of claim 10, wherein the filtering out the portion from the kernel routine results further comprises filtering out at least one of the one or more output parameters included in the kernel routine results.

14. The computing system of claim 10, wherein the pre-callback handler and the post-callback handler are uniquely associated with the kernel routine, and a plurality of pre-callback handlers and a plurality of post-callback handlers associated with different types of kernel routines are hooked to the operating system.

15. The computing system of claim 10, wherein the kernel routine comprises a file system operation.

16. The computing system of claim 10, wherein the kernel routine comprises a non-file system operation and does not include a file system operation.

17. The computing system of claim 10, wherein the pre-callback handler and the post-callback handler are hooked to the operating system, in a state where the operating system is not protected by a kernel patch protection.

18. The computing system of claim 10, wherein the operating system is a macOS.

19. A non-transitory computer-readable storage medium storing instructions that, when executed by one or more processors, cause the one or more processors to perform a method comprising:

hooking a pre-callback handler and a post-callback handler to an operating system of a computing device;

obtaining, by the pre-callback handler, a kernel routine request for a kernel routine to be performed in a kernel mode of the operating system;

determining, by the pre-callback handler, whether to allow the kernel routine to be performed based on one or more input parameters of the kernel routine request, wherein the determination by the pre-callback handler is based on whether a value of at least one of the input parameters exceeds a threshold and/or matches a standard input value;

upon determining that the kernel routine is allowed to be performed, causing the kernel routine to be performed in the kernel mode to generate kernel routine results;

determining, by the post-callback handler, whether to allow the kernel routine results of the kernel routine to be returned based on one or more output parameters of the kernel routine request, wherein the determination by the post-callback handler is based on whether a value of at least one of the output parameters exceeds a threshold and/or matches a standard output value;

upon determining that the kernel routine results of the kernel routine are allowed to be returned, causing the kernel routine results of the kernel routine to be returned to an application that is executed in a non-kernel mode of the operating system; and upon determining that the kernel routine results are not allowed to be returned, modifying the kernel routine results, wherein the modifying the kernel routine results comprises filtering out a portion from the kernel routine results that is not accessible by a function call corresponding to the kernel routine, and causing the modified kernel routine results and a first post-operation error indicating the portion of the kernel routine results has not been accessed to be returned to the application.

20. The method of claim 19, further comprising upon determining that the kernel routine is not allowed to be performed, preventing the kernel routine from being performed and causing a pre-operation error to be returned to the application.

* * * * *